I. A. WEAVER.
LUBRICATION OF VEHICLE SPRINGS.
APPLICATION FILED MAR. 13, 1916.
1,188,590.  
Patented June 27, 1916.
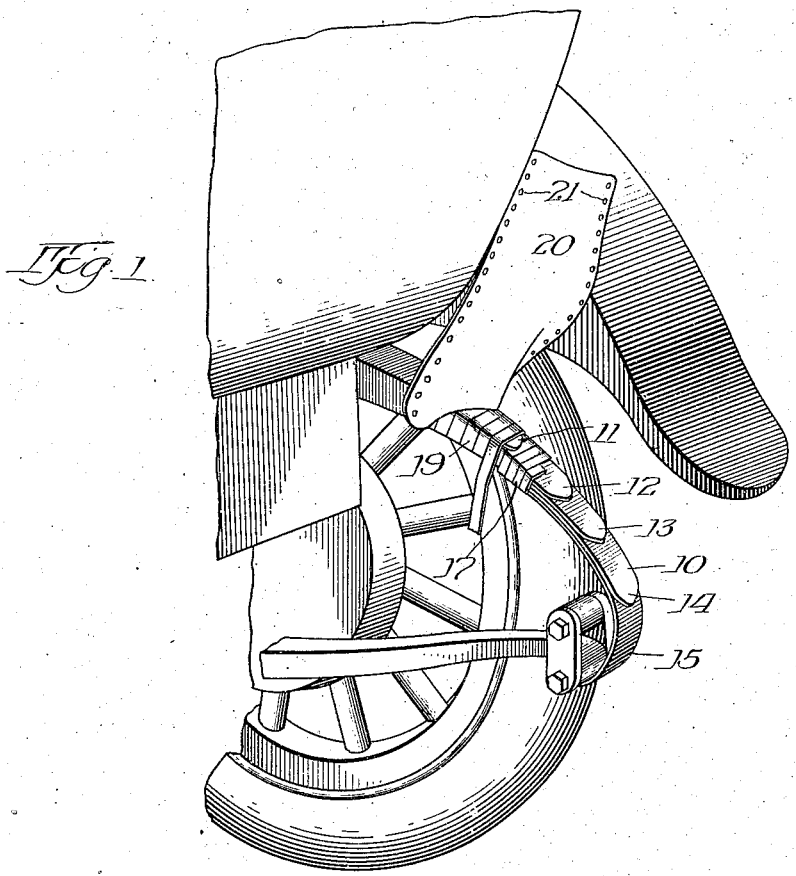
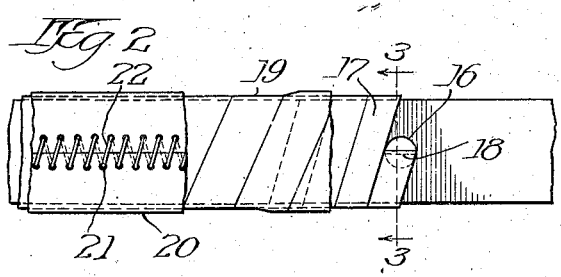
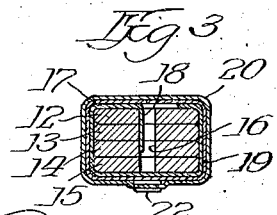
Witnesses:  
Geo. C. Davison  
R. Burkhardt
Inventor  
Ira A. Weaver  
By Walter M. Fuller  
Atty.

UNITED STATES PATENT OFFICE.

IRA A. WEAVER, OF SPRINGFIELD, ILLINOIS, ASSIGNOR TO THE WEAVER MANUFACTURING COMPANY, OF SPRINGFIELD, ILLINOIS, A CORPORATION OF ILLINOIS.

LUBRICATION OF VEHICLE-SPRINGS.

1,188,590.      Specification of Letters Patent.      Patented June 27, 1916.

Application filed March 13, 1916. Serial No. 83,769.

*To all whom it may concern:*

Be it known that I, IRA A. WEAVER, a citizen of the United States, residing at Springfield, in the county of Sangamon and State of Illinois, have invented certain new and useful Improvements in Lubrication of Vehicle-Springs, of which the following is a specification.

The body-supporting springs of automobiles, especially those of the superposed leaf type, require a lubricant between their leaves to permit such comparatively-thin, flexible elements to shift relatively to one another, to prevent rusting, and to secure a desirable high degree of resiliency. Such a lubricant, under the flexing action of the spring, gradually works out from between the leaves both at their sides and ends with the objectionable result that the oozing greasy material collects dust and dirt, presenting an unsightly appearance and tending more or less to find its way between the leaves.

One object of this invention is to prevent to a large extent such discharge of the lubricant and to compel that which is expelled to find its way out only beneath the spring, where it readily drops to the ground, or, at least, is out of sight.

A further object of the invention is to give such springs a pleasing upholstered appearance.

In order that those skilled in this art may fully comprehend the structural and functional advantages of an appliance embodying this invention, I have illustrated a preferred incorporation of the same in the accompanying drawing, which forms a part of this specification, and throughout the various views of which like reference characters refer to the same parts.

In this drawing: Figure 1 is a fragmentary perspective view of a portion of an automobile illustrating a part of the spring structure and showing portions of the elements entering into the improved device as partially removed or unwrapped from one of the springs; Fig. 2 is an enlarged fragmentary view from beneath the spring, and Fig. 3 is a cross-section on line 3—3 of Fig. 2.

As is usual in vehicles of this construction, the spring 10 is composed of a plurality of superposed, resilient, relatively-thin plates or leaves 11, 12, 13, 14, and 15, clamped together in any approved manner and held in proper register by a clip (not shown), one portion of which ordinarily occupies the aperture 16 extended through the leaves. Such ordinary clip in the practice of this invention is conveniently removed and replaced by a steel or other ribbon 17, one end 18 of which is bent down into the perforation 16, the remainder of the ribbon or strip being wrapped spirally around the previously-lubricated, superposed, leaf springs, a few times, as is clearly illustrated. In some instances it is not necessary to remove the ordinary spring clip, but where a particularly smooth piece of work is to be accomplished the substitution of this metal ribbon or bent strip for the clip is preferable. It performs the same function as the clip, maintaining the leaves in proper relation and preventing their shifting out of place. The whole spring, as well as the strip 17, is then wound spirally with an adhesive-coated tape 19, preferably waterproof, such for instance, as the tape ordinarily used by electricians for insulating purposes. The convolutions of this tape or band overlap one another slightly to secure a complete incasing of the spring. In Fig. 1 this wrapping is shown partially removed. The purpose of the tape is to retain the lubricant between the leaves of the spring and prevent its oozing out to a large extent. It also prevents the entrance of dirt to the spring.

In some instances the spring-clip and the retainer 17 may be both omitted, the tape being sufficiently strong to perform its peculiar lubricant-retaining function indicated above as well as the work of the clip. The spring having thus been wound or wrapped with the adhesive tape, it is covered by a leather, canvas, or other suitable sheath or covering 20, which is of substantially the length of the spring and of a graduated width so that it will neatly cover the spring without wrinkling. The longitudinal edges of this covering are perforated at 21 for the accommodation of a lacing 22, which is located beneath the spring, as is shown in Figs. 2 and 3. That is to say, the shoe or covering 18 is placed on or fitted over the spring so that its longitudinal edges will come beneath the lowermost leaf, thus compelling any grease or oil which works out to be discharged at a point where it will not be seen.

When it is desired to re-lubricate or regrease the spring, it is merely necessary to unlace and take off the cover, unwrap the spiral winding of adhesive tape, and remove the metal retainer or clamp 17, if one has been used. Then, after the springs have been treated, the parts may be readily replaced, it being borne in mind that the adhesive character of the tape causes it to become more or less adhered to the spring and to its own convolutions so that there is no danger of its becoming displaced, bunched, or wrinkled. Stated somewhat differently, the complete spring has a pleasing, smooth, finished appearance. It does not attract or retain dust or dirt and holds the lubricant in the spring for an indefinite period, where it can perform its proper function.

Obviously, this invention is not confined and restricted to the precise and exact features of construction illustrated and described because these may be changed in many respects without departure from the invention and without loss of any of its valuable features.

I claim:

1. In a structure of the character described, the combination of a spring composed of a plurality of coöperating superposed leaves, and an adhesive lubricant-retaining cover incasing said leaves, substantially as described.

2. In a structure of the character described, the combination of a spring composed of a plurality of coöperating superposed leaves, and a lubricant-retaining adhesive spiral winding incasing said leaves, substantially as described.

3. In a structure of the character described, the combination of a spring composed of a plurality of coöperating superposed leaves, a lubricant-retaining adhesive spiral winding incasing said leaves, and an outer cover over said winding, substantially as described.

4. In a structure of the character described, the combination of a spring composed of a plurality of coöperating superposed leaves, a lubricant-retaining adhesive spiral winding incasing said leaves, and an outer cover over said winding open only below said spring, substantially as described.

5. In a structure of the character described, the combination of a spring composed of a plurality of coöperating superposed leaves, a lubricant-retaining adhesive spiral winding incasing said leaves, and an outer cover over said winding having its longitudinal edges laced together beneath the spring, substantially as described.

6. In a structure of the character described, the combination of a spring composed of a plurality of coöperating superposed leaves, a lubricant-retaining cover incasing said spring, and an outer sheath over said cover open only beneath the spring, substantially as described.

7. In a structure of the character described, the combination of a spring composed of a plurality of coöperating superposed leaves, and a lubricant-retaining spiral winding incasing said spring, substantially as described.

8. In a structure of the character described, the combination of a spring composed of a plurality of coöperating superposed leaves, means to maintain said leaves in register, a spiral lubricant-retaining winding incasing said leaves, and an outer covering over said winding, substantially as described.

9. In a structure of the character described, the combination of a spring composed of a plurality of coöperating superposed leaves, a spiral lubricant-retaining winding incasing said leaves, and an outer covering over said winding, substantially as described.

IRA A. WEAVER.

Witnesses:
J. R. REYNOLDS,
R. C. BENNETT.